(12) United States Patent
Kinoshita et al.

(10) Patent No.: US 7,955,208 B2
(45) Date of Patent: Jun. 7, 2011

(54) TORQUE DISTRIBUTING APPARATUS

(75) Inventors: Kiyotaka Kinoshita, Chiryu (JP); Minoru Onitake, Kariya (JP); Kunihiko Suzuki, Gamagoori (JP); Isao Ito, Iwakura (JP)

(73) Assignee: JTEKT Corporation, Osaka-shi (JP)

( * ) Notice: Subject to any disclaimer, the term of this patent is extended or adjusted under 35 U.S.C. 154(b) by 712 days.

(21) Appl. No.: 11/939,163

(22) Filed: Nov. 13, 2007

(65) Prior Publication Data

US 2008/0113842 A1 May 15, 2008

(30) Foreign Application Priority Data

Nov. 13, 2006 (JP) ................. 2006-306897
Nov. 13, 2006 (JP) ................. 2006-306898
Jul. 13, 2007 (JP) ................. 2007-184364

(51) Int. Cl.
*F16H 48/30* (2006.01)
*F16H 3/72* (2006.01)
*F16H 37/08* (2006.01)
*F16H 57/04* (2006.01)
*F16H 57/08* (2006.01)

(52) U.S. Cl. ............ 475/150; 475/5; 475/205; 475/159; 475/339

(58) Field of Classification Search .............. 475/5, 149, 475/150, 151, 221, 338, 339, 204, 205, 159, 475/160
See application file for complete search history.

(56) References Cited

U.S. PATENT DOCUMENTS

| | | | | |
|---|---|---|---|---|
| 5,372,213 A * | 12/1994 | Hasebe et al. | ........... | 180/65.6 |
| 5,419,406 A * | 5/1995 | Kawamoto et al. | ......... | 180/65.6 |
| 5,637,048 A * | 6/1997 | Maeda et al. | ................ | 475/150 |
| 7,278,941 B2 * | 10/2007 | Holmes et al. | .................... | 475/5 |
| 7,311,631 B2 * | 12/2007 | Kushino | ...................... | 475/221 |
| 7,507,178 B2 * | 3/2009 | Rosemeier et al. | ........... | 475/205 |
| 7,559,871 B2 * | 7/2009 | Amano et al. | ..................... | 477/3 |
| 7,588,511 B2 * | 9/2009 | Tangl et al. | ..................... | 475/150 |
| 2002/0094898 A1 * | 7/2002 | Hata et al. | ......................... | 475/5 |
| 2009/0197727 A1 * | 8/2009 | Janson | ............................. | 475/5 |

* cited by examiner

*Primary Examiner* — Roger Pang
(74) *Attorney, Agent, or Firm* — Oblon, Spivak, McClelland, Maier & Neustadt, L.L.P.

(57) ABSTRACT

A torque distributing apparatus 8 comprises a differential gear unit 14, a planetary gear set 31 arranged between first and second output shafts 12L and 12R, a motor 32 driving the planetary gear set 31, and a speed change gear set 51 compensating a speed change ratio of the planetary gear set 31. The planetary gear set 31 and the speed change gear set 51 are arranged coaxially outward of the first output shaft 12L. The motor 32 is arranged coaxially outward of the planetary gear set 31 and the speed change gear set 51.

5 Claims, 12 Drawing Sheets

TORQUE DISTRIBUTING APPARATUS

INCORPORATION BY REFERENCE

The present application claims priority under 35 U.S.C. §119 to Japanese Patent Applications No. 2006-306897 filed on Nov. 13, 2006, No. 2006-306898 filed on Nov. 13, 2006 and No. 2007-184364 filed on Jul. 13, 2007. The contents of the applications are incorporated herein by reference in their entirety.

BACKGROUND OF THE INVENTION

1. Field of the Invention

This invention relates to a torque distributing apparatus that controls the torque distributing ratio to first and second output shafts from a power source.

2. Discussion of the Background

Japanese patent No. 3247484, for example, discloses a torque distributing apparatus that has a differential gear unit, a planetary gear set and a motor. The differential gear unit transmits an input torque to first and second output shafts while allowing differential rotation between the output shafts. The planetary gear set is arranged between the first and second output shafts. The motor is connected with the planetary gear set. When the motor drives the planetary gear set, the torque distributing apparatus provides differential rotation between the first and second output shafts. The motor controls torque to the planetary gear set so as to control the torque distributing ratio to the first and second output shafts from a power source, e.g. an engine. In the torque distributing apparatus, the planetary gear set has planetary gears that are carried by a planetary carrier and engage with a sun gear and a ring gear, and one of the sun and ring gears is connected with the motor as an input element of the motor torque. A speed change gear set is arranged beside the planetary gear set in order to compensate its gear ratio. The speed change gear set has the same construction as the planetary gear set, wherein the both sun gears or ring gears are connected with no relative rotation and another gear of the speed change gear set is fixed on the nonrotatable portion. The prior art, however, has difficulty in gaining a large reduction gear ratio of the planetary gear set. Thus it is necessary, for sufficient torque for providing the differential rotation, to increase the motor output or add an additional reduction gear set. In addition, since the planetary gears, sun gear and ring gear are arranged on the same plane, it is complicated to support the planetary carrier, sun gear and ring gear. Therefore the prior art has a large size and complicated assembling operation.

Another prior art, Japanese patent application publication No. 2006-112474, discloses a torque distributing apparatus whose controlling motor is disposed outside of a housing of the planetary gear set. The motor is connected to the planetary gear set via a reduction gear set so as to gain the sufficient torque for providing the differential rotation. However the prior art becomes large because of the reduction gear set. If the reduction gear set is downsized then, as a trade-off, the motor must be large to provide sufficient driving torque. In addition, since the motor projects from the housing, the torque distributing apparatus has a weight imbalance and may interfere with other parts installed in the underbody of a vehicle. Further, if the reduction gear set is provided with large reduction gear ratio in order to downsize the motor, when one wheel slips during driving on μ-split road and there occurs a large differential rotation between the wheels, overspeed of the motor may happen.

SUMMARY OF THE INVENTION

According to the invention, a torque distributing apparatus comprises a differential gear unit transmitting an input torque to first and second output shafts while allowing a differential rotation between the first and second output shafts, a planetary gear set arranged between the first and second output shafts, a motor driving the planetary gear set, and a speed change gear set compensating a speed change ratio of the planetary gear set. The planetary gear set is arranged coaxially outward of the first output shaft, and has a plurality of planetary gears, a planetary carrier carrying the planetary gears revolvably and rotatably, a first gear engaging with the planetary gears and a second gear engaging with the planetary gears, wherein the planetary carrier is an input element of a torque of the motor. The speed change gear set is arranged coaxially outward of the first output shaft, and has a plurality of planetary gears, a planetary carrier carrying the planetary gears rotatably, a third gear engaging with the planetary gears and a fourth gear engaging with the planetary gears, wherein the planetary carrier is fixed to a nonrotatable portion. The first gear of the planetary gear set is integrated with the third gear of the speed change gear set. One of the second gear and the fourth gear is connected with the first output shaft for no relative rotation, and the other is connected with the differential gear unit. The motor is arranged coaxially outward of the planetary gear set and the speed change gear set.

According to the invention, a torque distributing apparatus comprises a differential gear unit transmitting an input torque to first and second output shafts while allowing a differential rotation between the first and second output shafts, a planetary gear set arranged between the first and second output shafts, a motor driving the planetary gear set, and a speed change gear set compensating a speed change ratio of the planetary gear set. The planetary gear set is arranged coaxially outward of the first output shaft, and has a plurality of planetary gears with first and second pinions whose diameters of pitch circles are different each other, a planetary carrier carrying the planetary gears revolvably and rotatably, a first gear engaging with the first pinions and a second gear engaging with the second pinions, wherein the planetary carrier is an input element of a torque of the motor. The speed change gear set is arranged coaxially outward of the first output shaft, and has a plurality of planetary gears with third and fourth pinions whose diameter ratio of pitch circles equals to that of the first and second pinions respectively, a planetary carrier carrying the planetary gears rotatably, a third gear engaging with the third pinions and a fourth gear engaging with the fourth pinions, wherein the planetary carrier is fixed to a nonrotatable portion. The first gear of the planetary gear set is integrated with the third gear of the speed change gear set. One of the second gear and the fourth gear is connected with the first output shaft in no relative rotation, and the other is connected with the differential gear unit.

BRIEF DESCRIPTION OF THE DRAWINGS

Various objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
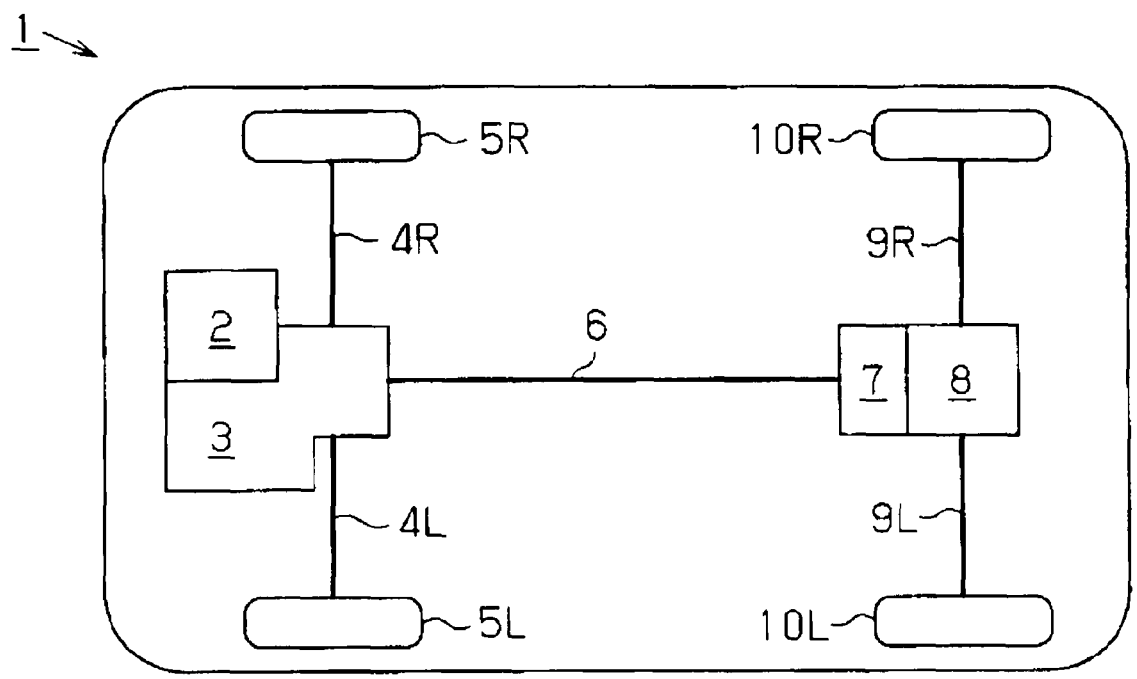
FIG. 1 is a skeleton view of a vehicle.

A first embodiment related to the present invention will be described with reference to FIGS. 1 to 5. FIG. 1 is a skeleton view of a vehicle 1 and FIG. 2 is a section view of a torque distributing apparatus 8.

FIG. 1 shows the vehicle 1 that is a four-wheel drive vehicle of on-demand type based on front drive. An engine 2 is mounted in the vehicle 1, which is adjacently connected with a transaxle 3. A pair of front axles 4L and 4R is connected with the transaxle 3 so that a torque of the engine 2 is transmitted to a pair of front wheels 5L and 5R through the transaxle 3 and the front axles 4L, 4R. The transaxle 3 is also connected with a propeller shaft 6 which is connected to a pair of rear axles 9L and 9R via a torque coupling 7 and the torque distributing apparatus 8. Thus, when the torque coupling 7 operates, a part of the torque of the engine 2 is transmitted to a pair of rear wheels 10L and 10R through the propeller shaft 6, the torque coupling 7, the torque distributing apparatus 8 and the rear axles 9L, 9R.

Figure 2:
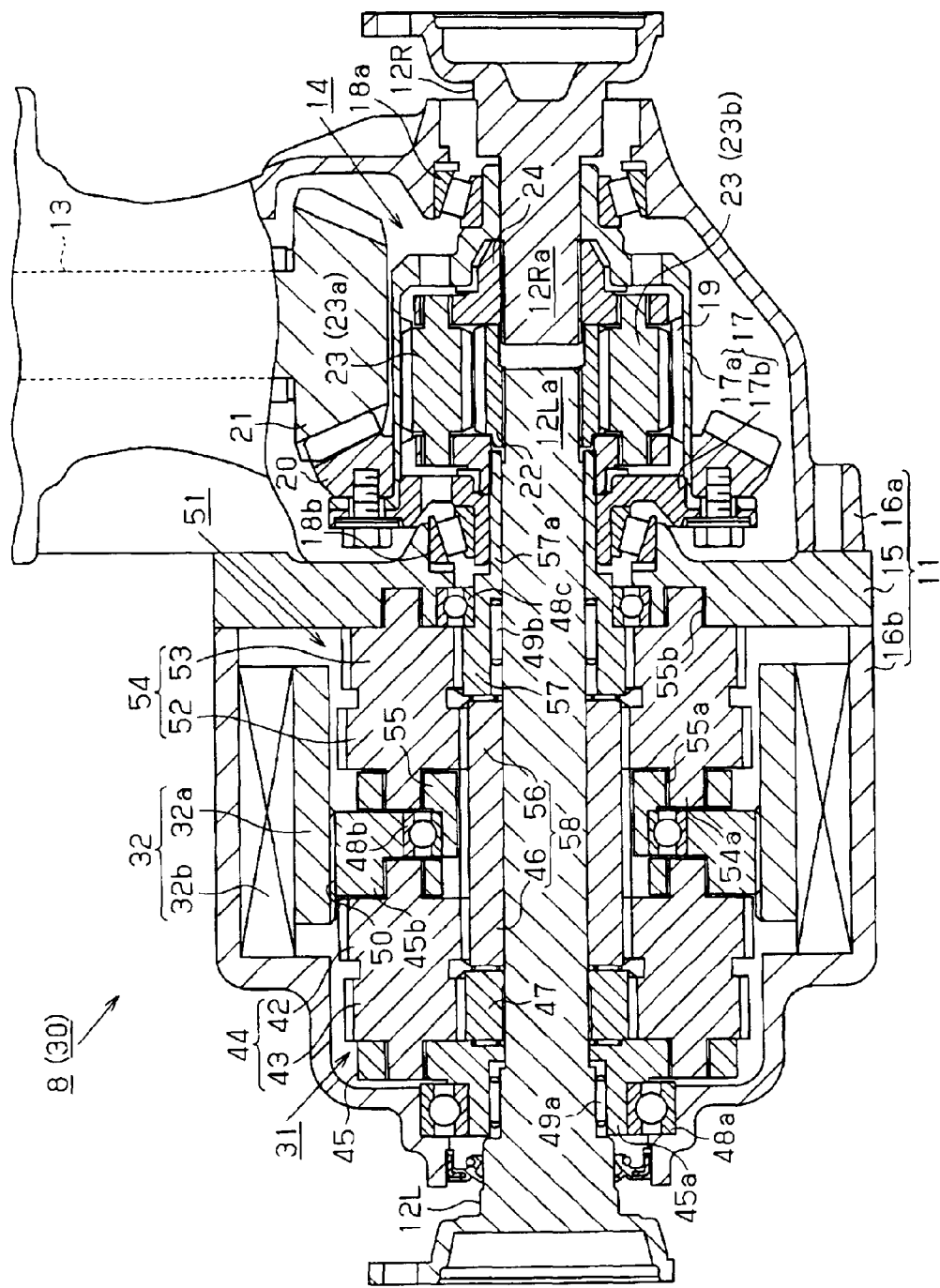
FIG. 2 is a section view of a torque distributing apparatus of a first embodiment related to the invention.

As shown in FIG. 2, the torque distributing apparatus 8 of the first embodiment comprises an approximately cylindrical housing 11 in which are installed first and second output shafts 12L and 12R coaxially constructing the rear axles 9L, 9R. Also in the housing 11, there is perpendicularly arranged an input shaft 13 which is connected with the torque coupling 7. The input shaft 13 is connected to the first and second output shafts 12L, 12R via a planetary gear type differential gear unit 14. The housing 11 comprises a first housing 16a and a second housing 16b which are connected by a wall 15. The differential gear unit 14 is installed in the first housing 16a, and a planetary gear set 31 and a speed change gear set 51 described hereinafter are installed in the second housing 16b.

The differential gear unit 14 has an approximately cylindrical differential case 17 which is rotatably supported by bearings 18a and 18b about the axes of the first and second output shafts 12L, 12R. Ends 12La and 12Ra of the first and second output shafts 12L and 12R are provided in the differential case 17. The differential case 17 has a ring gear 19 on its inner surface and a bevel gear 20 on its outer surface. The differential case 17 comprises a first part 17a supported by the bearing 18a and a second part 17b supported by the bearing 18b. A bolt fixes the first part 17a, the second part 17b and the bevel gear 20. The bevel gear 20 engages with a drive pinion 21 at the end of the input shaft 13. In the differential case 17, a sun gear 22 is put on the end 12La of the first output shaft 12L, and plural pairs of planetary gears 23 are arranged between the sun gear 22 and the ring gear 19 on the inner surface of the differential case 17. Each pair of the planetary gears 23 comprises a first planetary gear 23a engaging with the ring gear 19 and a second planetary gear 23b engaging with the sun gear 22. Respective first and second planetary gears 23a and 23b are engaged each other, and are supported by a planetary carrier 24 rotatably and revolvably. The planetary carrier 24 is connected with the end 12Ra of the second output shaft 12R for no relative rotation.

Thus the torque of the propeller shaft 6 is transmitted to the differential case 17 through the torque coupling 7 and the drive pinion 21. The sun gear 22 and the planetary carrier 24 are rotated with the differential case 17 via the pairs of the planetary gears 23 so as to transmit the torque to the first and second output shafts 12L and 12R, the rear axles 9L and 9R and the rear wheels 10L and 10R. On the other hand, for example, when the vehicle turns and the differential rotation is provided between the rear wheels 10L, 10R, respective first and second planetary gears 23a, 23b rotate and revolve so that the differential gear unit 14 allows the differential rotation between the first and second output shafts 12L, 12R.

The torque distributing apparatus 8 has a torque distributor 30 which controls the torque distributing ratio to the right and left rear wheels 10R and 10L. As shown in FIG. 2, the torque distributor 30 comprises the planetary gear set 31. The planetary gear set 31 is arranged between the first and second output shafts 12L, 12R, and is connected with a motor 32 to be driven. When the planetary gear set 31 is driven by the torque of the motor 32, i.e., the control torque, the torque distributor 30 provides the differential rotation between the first and second output shafts 12L, 12R. Thus the input torque from the input shaft 13 is adjustably distributed to the first and second output shafts 12L, 12R in an appropriate ratio depending on a driving condition of the vehicle.

As shown in FIG. 2, the torque distributor 30 has the planetary gear set 31, the speed change gear set 51 and the motor 32 in the second housing 16b. The planetary gear set 31 is coaxially arranged on the first output shaft 12L at the opposite side (left side in FIG. 2) of the differential gear unit 14. The planetary gear set 31 comprises plural planetary gears 44 and a planetary carrier 45 supporting the planetary gears 44 rotatably and revolvably. Each planetary gear 44 has a first pinion 42 and a second pinion 43 which are nonrotatably integrated, wherein the pitch circle diameter of the first pinion 42 is a little larger than that of the second pinion 43. The planetary gear set 31 also comprises a first sun gear 46 and a second sun gear 47 adjacently arranged on the first output shaft 12L. The first sun gear 46 engages with the first pinions 42 and the second sun gear 47 engages with the second pinions 43.

The planetary carrier 45 has a cylindrical part 45a into which the first output shaft 12L is inserted. The planetary carrier 45 is supported by a ball bearing 48a arranged at the interior of the second housing 16b and a needle bearing 49a arranged on the first output shaft at the cylindrical part 45a, so as to relatively rotate about the first output shaft 12L. Respective planetary gears 44 are rotatably supported by the planetary carrier 45 where respective second pinions 43 are arranged beside the cylindrical part 45a. The planetary carrier 45 also has a ring part 45b arranged coaxially outward of the first output shaft 12L. The ring part 45b has outer teeth 50 on its outer surface and engages with the motor 32. Thus the planetary carrier 45 is an input element of the motor torque. The second sun gear 47 is connected with the first output shaft 12L for no relative rotation by spline-fitting. The first sun gear 46 is connected to the planetary carrier 24 of the differential gear unit 14 via the speed change gear set 51. In the case of lack of the speed change gear set 51, since the planetary gear set 31 has a predetermined gear ratio according to engagement of respective gears, the planetary carrier 45 as the input element of the motor torque rotates even without the differential rotation between the first and second output shafts 12L, 12R. Such rotation may supply a load to the motor 32.

The first embodiment comprises the speed change gear set 51 interposed between the planetary gear set 31 and the differential gear unit 14 at closer side of one end 12La of the first output shaft 12L in order to compensate the speed change ratio of the planetary gear set 31. In detail, the speed change gear set 51 is arranged between the first sun gear 46 of the planetary gear set 31 and the planetary carrier 24 of the differential gear unit 14. Thus when the both rear axles 9L, 9R rotate in the same speed and the same direction (no differential rotation between the first and second output shafts 12L, 12R), no rotation is provided to the motor 32.

In detail, the speed change gear set 51 comprises plural planetary gears 54. Each planetary gear 54 has a third pinion 52 and a fourth pinion 53 which are nonrotatably integrated. The diameters of the pitch circles of the third pinion 52 and the fourth pinion 53 equal to those of the first pinion 42 and the second pinion 43 of the planetary gear set 31 respectively. Thus the diameter ratio of the pitch circles of the third pinion 52 and the fourth pinion 53 equals that of the first pinion 42 and the second pinion 43. The speed change gear set 51 also comprises a ring-like planetary carrier 55. The planetary carrier 55 is fixed to the interior of the housing 11 (second housing 16b) as the nonrotatable part and is arranged beside the ring part 45b of the planetary carrier 45 of the planetary gear set 31. A ball bearing 48b intervenes between the planetary carrier 55 and the ring part 45b so as to support the ring part 45b of the planetary carrier 45. A spindle 54a of each planetary gear 54 extends along its rotational axis and is rotatably supported by bores 55a and 55b of the planetary carrier 55 and the wall 15 of the housing 11. The speed change gear set 51 further comprises a third sun gear 56 and a fourth sun gear 57 which are coaxially arranged on the first output shaft 12L. The third sun gear 56 engages with the third pinions 52 and the fourth sun gear 57 engages with the fourth pinions 53. The third sun gear 56 is nonrotatably integrated with the first sun gear 46 of the planetary gear set 31. The fourth sun gear 57 is connected to the planetary carrier 24 of the differential gear unit 14 for no relative rotation. Therefore the speed change gear set 51 has a similar construction to the planetary gear set 31, however its planetary carrier 55 is fixed to the nonrotatable part of the housing 11.

The first sun gear 46 and the third sun gear 56 are made from the same cylindrical sleeve 58 and have the same shapes of teeth on the sleeve 58. The fourth sun gear 57 has the cylindrical part 57a which is connected with the planetary carrier 24 of the differential gear unit 14 with no relative rotation. The fourth sun gear 57 is rotatably supported by a needle bearing 49b on the first output shaft 12L and a ball bearing 48c on the housing 11 (wall 15).

The motor 32 is a brushless motor with a hollow rotor 32a, and is installed in the housing 11 (second housing 16b). The motor 32 is coaxially arranged to the first output shaft 12L in the radial outward of the planetary gear set 31 and the speed change gear set 51. In detail, a stator 32b of the motor 32 is fixed on the inner surface of the second housing 16b and the rotor 32a is rotatably supported inward of the stator 32b. The motor 32 extends axially and surrounds the planetary gear set 31 and the speed change gear set 51. The ring part 45b of the planetary carrier 45 is spline-fitted into the rotor 32a so as to be connected with the motor 32.

During no differential rotation between the first output shaft 12L and the second output shaft 12R, the torque distributor 30 provides no rotation to the planetary carrier 45 of the planetary gear set 31 connected with the motor 32. On the other hand, when the motor 32 drives the planetary carrier 45, differential rotation is provided between the first and second output shafts 12L, 12R, namely between the both rear axles 9L, 9R. Controlling the motor torque to the planetary gear set 31 provides both rear axles 9R, 9L with variably distributed torque which is input from the input shaft 13.

According to the first embodiment, the motor 32 is a brushless motor with a hollow rotor 32a which is coaxially arranged radial outward of the first output shaft 12L, the planetary gear set 31 and the speed change gear set 51 in the housing 11 (second housing 16b). The ring part 45b of the planetary carrier 45 is spline-fitted into the rotor 32a of the motor 32. Such construction provides a large diameter of the motor 32, although the apparatus does not become larger. Thus the motor 32 is able to supply large torque without a reduction gear, so as to be downsized. Thus the torque distributing apparatus 8 is downsized. Because of no reduction gear, when the vehicle runs on the μ-split road and one wheel slips, over-speed of the motor 32 will not happen, so as to gain reliability. In Addition, because of coaxial mount of the motor 32, the housing 11 has no overhang so as to easily prevent interference with an underbody of the vehicle or the other parts. Thus the torque distributing apparatus 8 is easily installed to the vehicle. Moreover, the motor 32 is arranged in the housing 11 (second housing 16b), so as to be cooled down by the lubricant oil. Being radial outward of the planetary gear set 31 and the speed change gear set 51, and because the lubricant oil is stirred by the planetary gear set 31 and the speed change gear set 51 so as to circulate, force-feed circulation cooling is provided for the motor. As a result, heat of the motor 32 is reduced so that high reliability is provided.

In the first embodiment, the planetary gear set 31 has plural planetary gears 44 whose respective first and second pinions 42, 43 are nonrotatably connected, wherein the diameter of the pitch circle of the first pinion 42 is different from that of the second pinion 43. Also, the speed change gear set 51 has plural planetary gears 54 whose respective third and fourth pinions 52, 53 are nonrotatably connected, wherein the diameter of the pitch circle of the third pinion 52 equals to that of the first pinion 42 and that of the fourth pinion 53 equals to that of the second pinion 43. Because so-called two pinion gears are used for the planetary gears 44 and 54, the planetary gear set 31 and the speed change gear set 51 provide high speed change ratios and sufficient engagements between respective gears. Therefore the motor 32 is able to supply sufficient torque to provide the differential rotation without more power or an additional gear set, so as to be downsized. Therefore the torque distributing apparatus 8 is downsized.

A second embodiment will be described with reference to FIGS. 3 and 4. In the second embodiment, the same/equivalent parts will be indicated by reference numbers having the same last two digits as the first embodiment and the explanation of those parts will be omitted.

Figure 3:
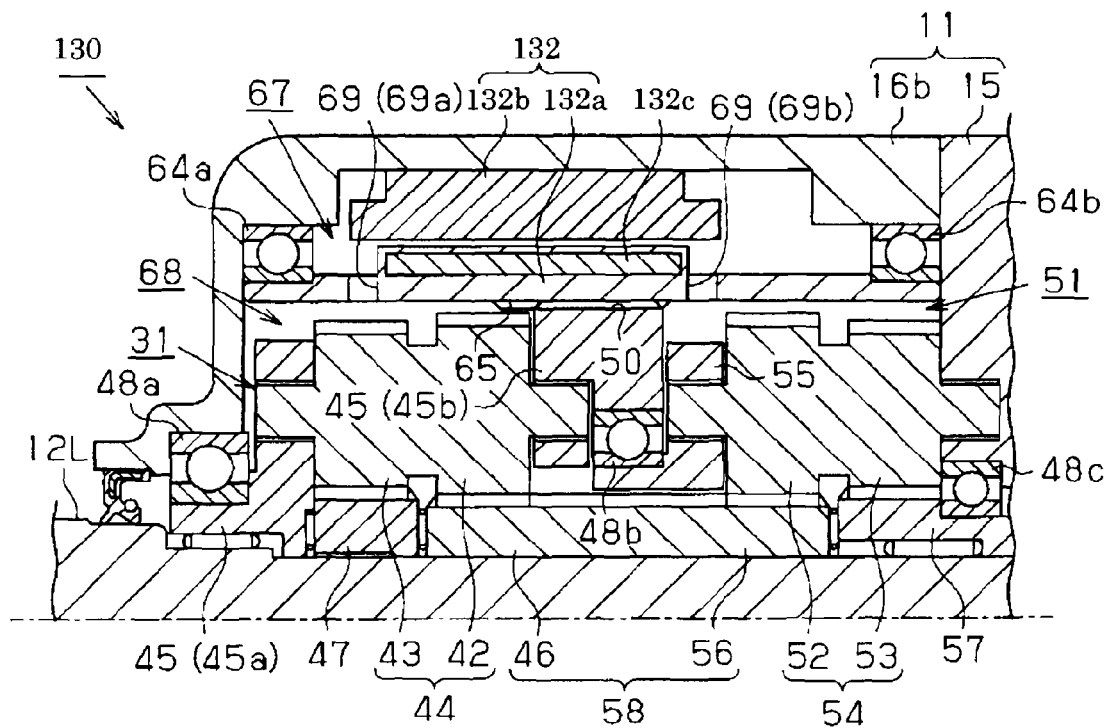
FIG. 3 is a section view of a torque distributor of a second embodiment related to the invention.
Figure 4:
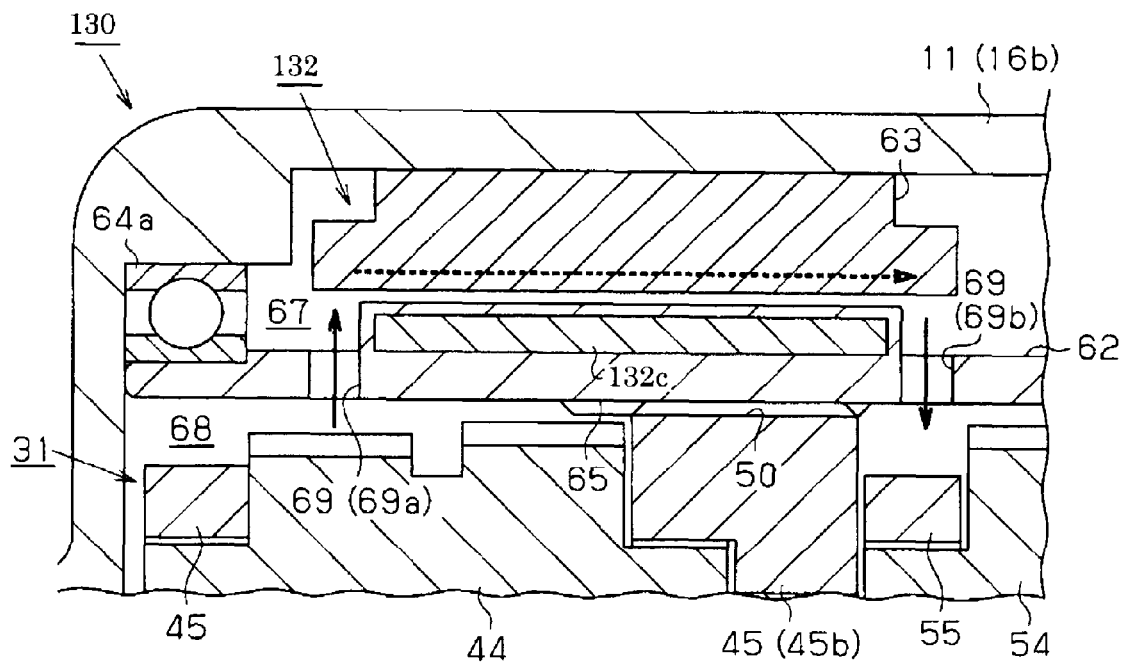
FIG. 4 is an enlarged section view of the torque distributor of the second embodiment.

As shown in FIG. 3, in the torque distributor 130, the motor 132 has the hollow rotor 132a and the stator 132b. The rotor 132a is coaxially arranged radially outward of the planetary gear set 31 and the speed change gear set 51. The stator 132b is coaxially arranged radially outward of the rotor 132a. The motor 132 is a brushless motor whose rotor 132a has plural magnets 132c. The stator 132b is fixed onto the inner surface of the housing 11 (second housing 16b). The rotor 132a is rotatably supported by ball bearings 64a and 64b radially inward of the stator 132b in the housing 11. Teeth 65 of the rotor 132a are spline-fitted to the teeth 50 of the ring part 45b of the planetary carrier 45 of the planetary gear set 31. Namely the planetary gear set 31 is driven by the motor 132 through the spline-engagement between the rotor 132a and the planetary carrier 45.

The motor 132 has a motor room 67 between the rotor 132a and the stator 132b. The motor room 67 is communicatively connected to a gear room 68 where the planetary gear set 31 and the speed change gear set 51 are installed. In detail, the rotor 132a of the motor 132 has plural through holes 69 (69a and 69b), wherein the through holes 69a are located outward of the planetary gear set 31. The through holes 69b are not located outward of the planetary gear set 31 but outward between the planetary gear set 31 and the speed change gear set 51. Thus the motor room 67 is communicatively connected to the gear room 68 so that the lubricant oil in the gear room 68 is stirred by the planetary gear set 31 (and the speed change gear set 51) so as to flow into the motor room 67 and cool down the motor 132 sufficiently.

Negative pressure is provided between the planetary gear set 31 and the speed change gear set 51 where respective through holes 69b are located. Thus, as shown in FIG. 4, the lubricant oil is stirred by the revolution of the planetary gears 44 so as to flow into the motor room 67 through the through holes 69a. The lubricant oil goes through the motor room 67 (including air gap, teeth wound by coil, etc.) between the rotor 132a and the stator 132b, and returns to the gear room 68 through the through holes 69b of the rotor 132a. Therefore the lubricant oil smoothly and efficiently circulates between the motor room 67 and the gear room 68. The stator 132b of the motor 132 is insulated. The rotor 132a is quenched (soft nitride) on the surface facing to the stator 132b where the magnets 132c are placed.

According to the second embodiment, the motor room 67 is communicatively connected to the gear room 68. The lubricant oil is stirred by the planetary gear set 31 (and the speed change gear set 51) so as to flow into the motor room 67 from the gear room 68. Thus the hot portion of the stator 132b of the motor 132 directly contacts the lubricant oil as a refrigerant so as to be cooled down sufficiently.

The rotor 132a has plural through holes 69 communicatively connecting its interior and exterior. Therefore centrifugal force helps the lubricant oil to flow into the motor room 67. The rotor 132 has plural through holes 69a outward of the planetary gear set 31. Thus the lubricant oil is sufficiently supplied to the motor room 67 by revolution of the planetary gears 44. The rotor 132a has plural through holes 69b between the planetary gear set 31 and the speed change gear set 51 where the negative pressure is provided. Thus the lubricant oil sufficiently returns from the motor room 67 to the gear room 68. Therefore the motor 132 is sufficiently cooled down.

A third embodiment will be described with reference to FIGS. 5 to 8. In the third embodiment, the same/equivalent parts will be indicated by reference numbers having the same last two digits hereinbefore and the explanation of those parts will be omitted.

Figure 5:
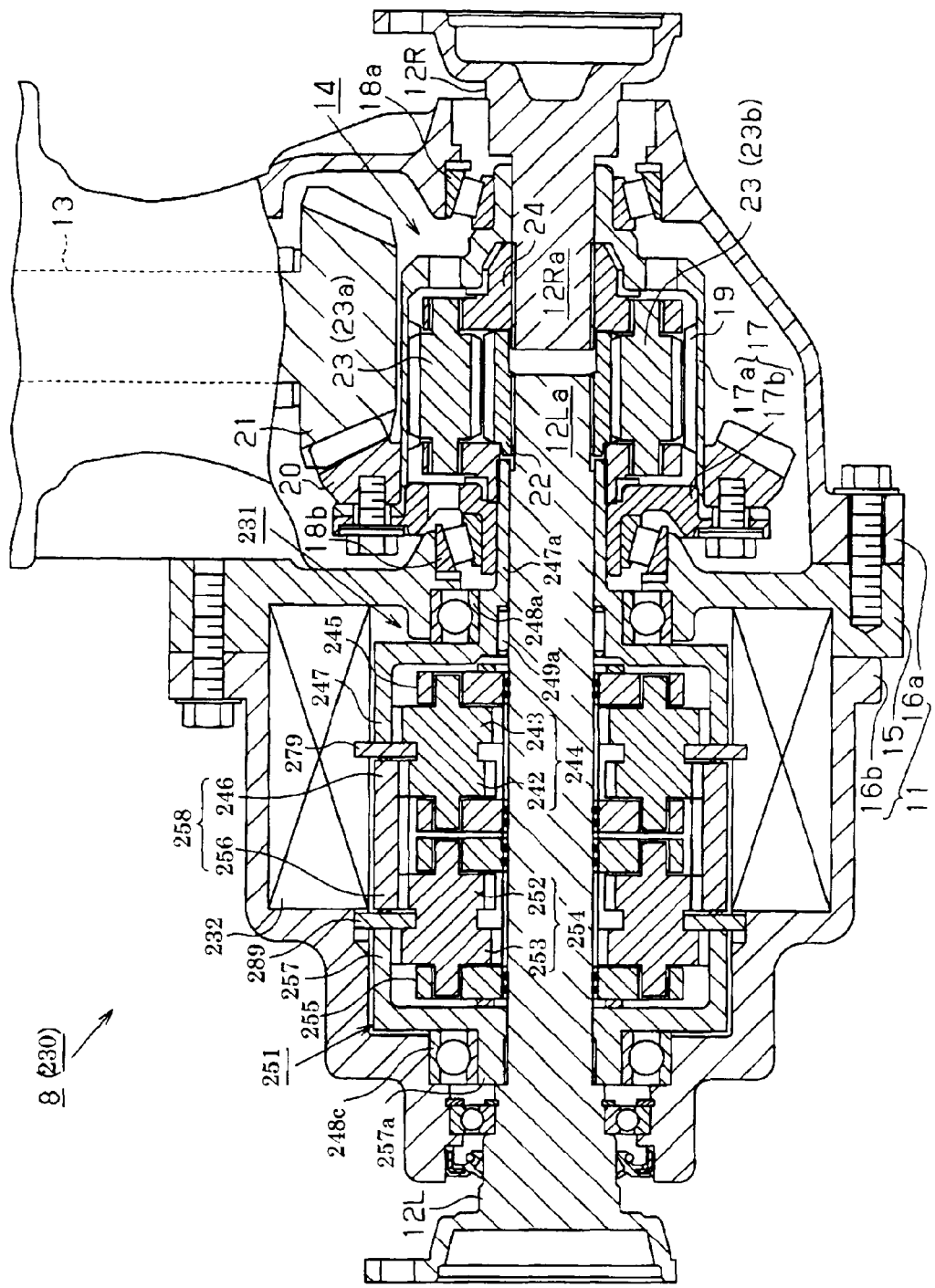
FIG. 5 is a section view of the torque distributing apparatus of a third embodiment related to the invention.
Figure 6:
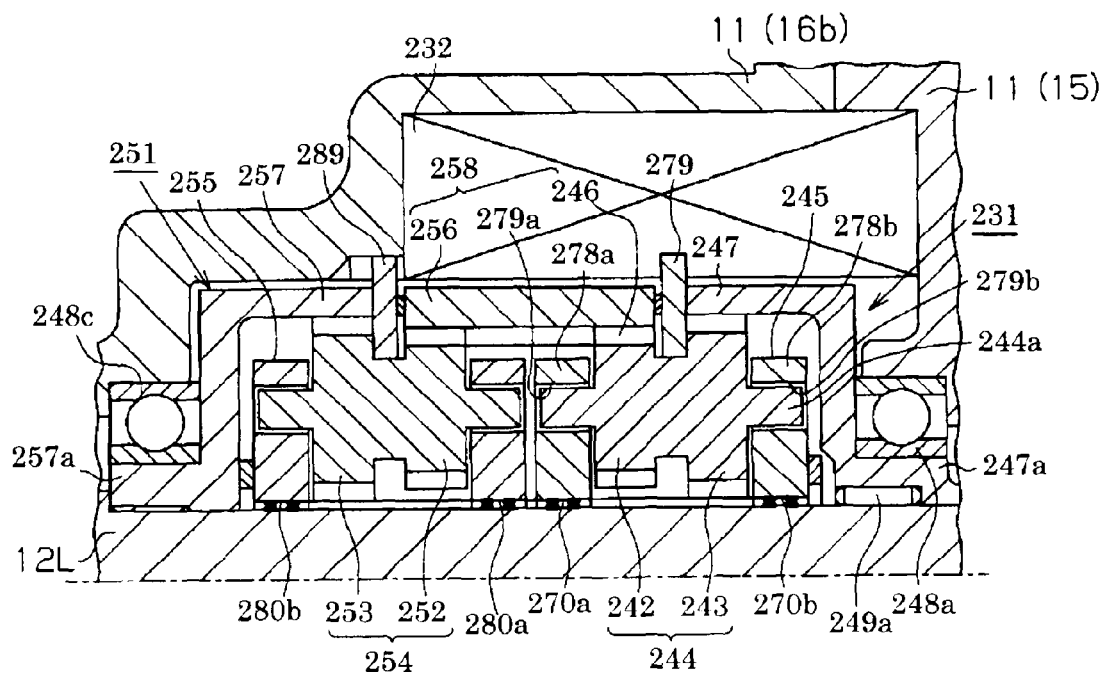
FIG. 6 is a section view of the torque distributor of the third embodiment.

As shown in FIGS. 5 and 6, the planetary gear set 231 comprises a plural number (four) of planetary gears 244 and a planetary carrier 245 supporting the planetary gears 244 revolvably and rotatably. Each planetary gear 244 coaxially has a first pinion 242 and a second pinion 243 in series, wherein nonrotatable connection is provided between the first and second pinions 242, 243 whose diameters of pitch circles are different from each other. In the third embodiment, the second pinion 243 has a little larger pitch circle than that of the first pinion 242.

Figure 7:
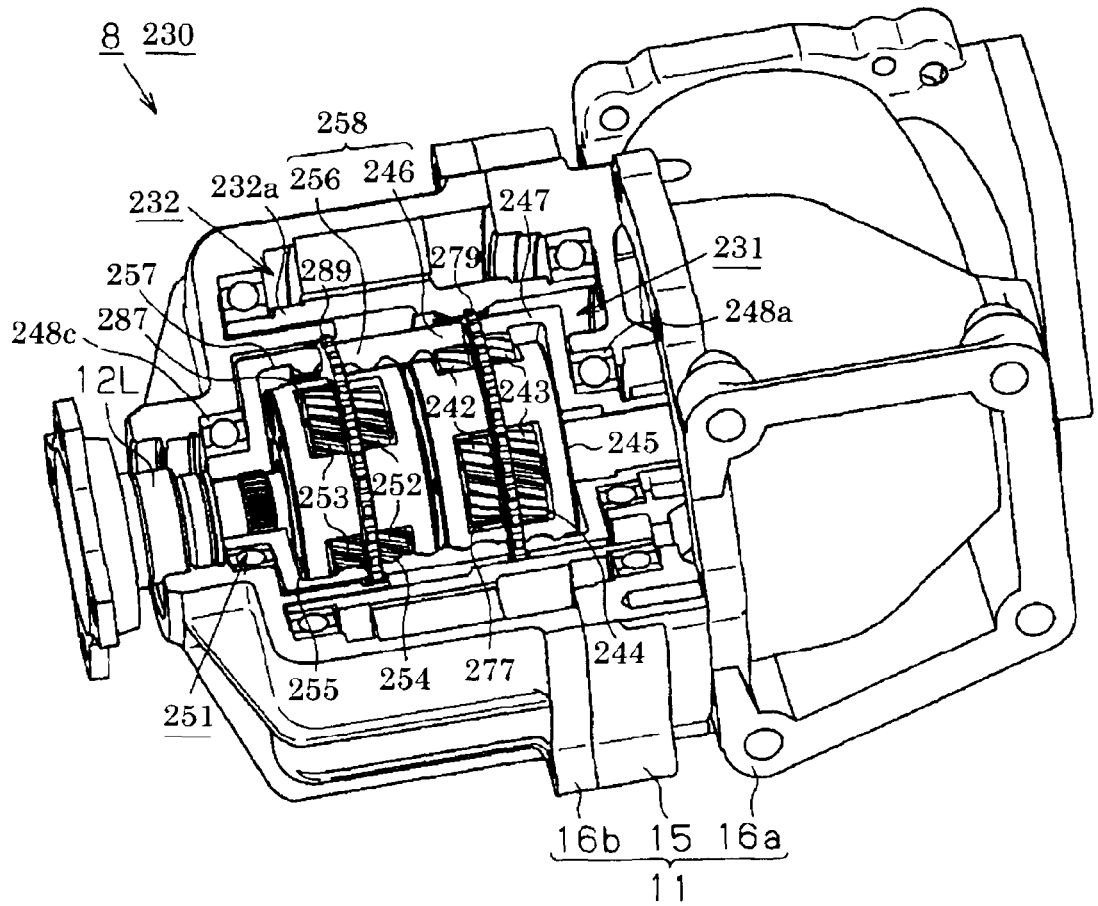
FIG. 7 is a perspective partial section view of the torque distributing apparatus of the third embodiment.
Figure 8:
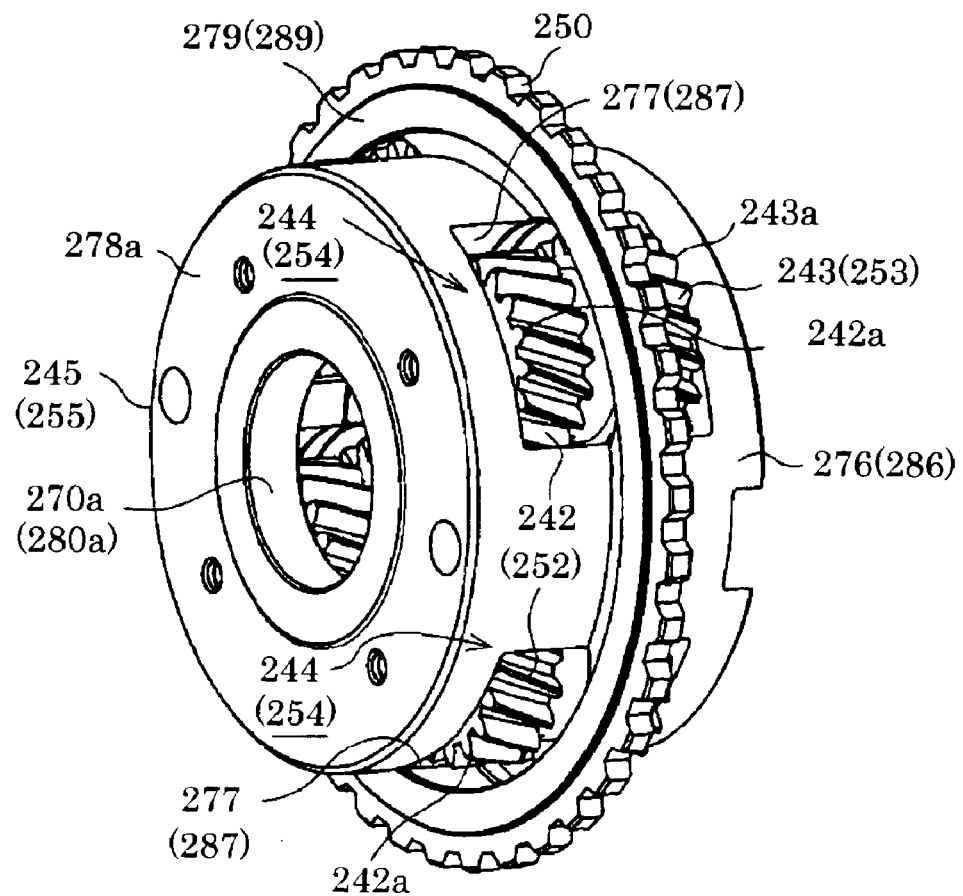
FIG. 8 is a perspective view of the planetary gear set of the third embodiment.

FIGS. 7 and 8 show a cuplike planetary carrier 245 whose circumferential wall 276 has plural openings 277 corresponding to the number of the planetary gears 244. Namely, the circumferential wall 276 has four openings 277 located equiangularly. Respective planetary gears 244 are rotatably supported and installed in the planetary carrier 245, wherein teeth 242a, 243a of respective first and second pinions 242, 243 face respective opening 277. As shown in FIG. 6, both bottoms 278a and 278b of the planetary carrier 245 have bores 279a and 279b at locations corresponding to the openings 277. Each planetary gear 244 has a spindle 244a, which extends toward its axis and is loosely fitted to the bores 279a and 279b, so as to be rotatably supported by the planetary carrier 245. (The speed change gear set 251 described hereinafter has the same support construction of planetary gears.) As shown in FIGS. 6 and 8, the bottoms 278a, 278b of the planetary carrier 245 have holes 270a, 270b to insert the first output shaft 12L about the axis of the planetary carrier 245. By inserting the first output shaft 12L into the holes 270a and 270b, the planetary carrier 245 is installed in the housing 11 (the second housing 16b). In the installation, respective second pinions 243 in the planetary carrier 245 are arranged beside the differential gear unit 14 (right side in FIG. 5). Thus the planetary carrier 245 is rotatably supported by the first output shaft 12L. For smooth rotation, bushes intervene between the first output shaft 12L and the holes 270a, 270b of the planetary carrier 245.

As shown in FIGS. 5 to 7, respective first pinions 242 and second pinions 243 have teeth 242a and 243a which protrude through the openings 277 of the planetary carrier 245 and respectively engage with a first ring gear 246 and a second ring gear 247. The second ring gear 247 engaging with the second pinions 243 is connected with the planetary carrier 24 of the differential gear unit 14 for no relative rotation. The second ring gear 247 has a cylindrical part 247a where the first output shaft 12L is inserted. The second ring gear 247 is rotatably supported by a ball bearing 248a placed on the inner surface of the housing 11 (wall 15) and by a needle bearing 249a placed on the first output shaft 12L at the cylindrical part 247a.

As shown in FIGS. 6 to 8, the circumferential wall 276 of the planetary carrier 245 has a radially expanding flange 279. The circumference of the flange 279 has outer teeth 250 which engage with the motor 232 as a drive source of control. Therefore the planetary carrier 245 of the planetary gear set 231 is an input element of the motor torque. The motor 232 is a brushless motor which has a hollow rotor 232a, and is arranged radially outward and coaxially of the planetary gear set 231. The teeth 250 of the flange 279 are spline-fitted into the inner surface of the rotor 232a so that the planetary carrier 245 is connected with the motor 232. The flange 279 is placed between the teeth 242a of the first pinions 242 and the teeth 243a of the second pinions 243 protruding through the openings 277 on the circumferential wall 276 of the planetary carrier 245. This ensures the engagement of the pinions 242, 243 and the ring gears 246, 247 and the support of the pinions 242, 243.

As shown in FIGS. 5 to 7, the torque distributor 230 further comprises the speed change gear set 251 in order to compensate the speed change ratio of the planetary gear set 231. The first ring gear 246 engaging with the first pinion 242 is connected to the first output shaft 12L via the speed change gear set 251. In the case of lack of the speed change gear set 251, since the planetary gear set 231 has predetermined gear ratio according to engagement of respective gears, the planetary carrier 245 as the input element of the motor torque rotates even without the differential rotation between the first and second output shafts 12L, 12R. Such rotation may give a load to the motor 232. On the other hand, in the third embodiment, the speed change gear set 251 is interposed between the first ring gear 246 of the planetary gear set 231 and the first output shaft 12L, wherein the speed change gear set 251 has the speed change gear ratio which compensates that of the planetary gear set 231. Therefore when both rear axles 9L, 9R rotate at the same speed and the same direction (no differential rotation between the first and second output shafts 12L, 12R), no rotation is provided to the motor 232.

In detail, as shown in FIG. 6, the speed change gear set 251 comprises plural (four) planetary gears 254. Each planetary gear 254 has a third pinion 252 and a fourth pinion 253 which are nonrotatably integrated. The diameters of pitch circles of the third pinion 252 and the fourth pinion 253 equal those of the first pinion 242 and the second pinion 243 of the planetary gear set 231 respectively. Thus the diameter ratio of pitch circles of the third pinion 252 and the fourth pinion 253 equals to that of the first pinion 242 and the second pinion 243. Respective planetary gears 254 are revolvably and rotatably supported by a planetary carrier 255 whose construction is the same as the planetary carrier 245 of the planetary gear set 231 (see FIG. 8). The planetary carrier 255 has holes 280a, 280b to insert the first output shaft 12L so as to be installed in the housing 11 (the second housing 16b), similar to the planetary carrier 245 of the planetary gear set 231. The planetary carrier 255 is placed beside the planetary carrier 245 of the planetary gear set 231 but at the other side of the differential gear unit 14 (left side in FIG. 5). In the planetary carrier 255, respective third pinions 252 of the planetary gears 254 are located beside the planetary gear set 231 (right side in FIG. 5). The planetary carrier 255 is rotatably supported by the first output shaft 12L inserted in the holes 280a, 280b. Bushes intervene between the holes 280a, 280b and the first output shaft 12L for smooth rotation.

The planetary carrier 255 has four openings 287 where respective third and fourth pinions 252, 253 protrude through (see FIG. 8). The third pinions 252 engage with a third ring gear 256 having the same construction as the first ring gear 246. The fourth pinions 253 engage with a fourth ring gear 257 having the same construction as the second ring gear 247. The third ring gear 256 is nonrotatably integrated with the first ring gear 246. The fourth ring gear 257 is connected with the first output shaft 12L for no relative rotation. The planetary carrier 255 has a flange 289 on its circumferential wall 286, wherein the flange 289 is spline-fitted to the inner surface of the housing 11 (second housing 16b). Thus the planetary carrier 255 is nonrotatably fixed to the housing 11. The flange 289 is a fixing element of the speed change gear set 251 to the nonrotational part. In the third embodiment, the first ring gear 246 and the third ring gear 256 have the same body of a cylindrical sleeve 258, and are toothed on the inner surface of the sleeve 258 in parallel. The fourth ring gear 257 has a cylindrical part 257a to be spline-fitted to the first output shaft 12L by inserting the same. The fourth ring gear 257 is rotatably supported by the housing 11 (second housing 16b) through a ball bearing 248c at the cylindrical part 257a.

In the torque distributor 230 of the third embodiment described hereinbefore, during no differential rotation between the first output shaft 12L and the second output shaft 12R, no rotation is provided to the planetary carrier 245 connected with the motor 232. On the other hand, when the motor 232 drives the planetary carrier 245, differential rotation is provided between the first and second output shafts 12L, 12R, namely between the both rear axles 9L, 9R. Controlling the motor torque to the planetary gear set 231 provides the both rear axles 9R, 9L with variably distributed torque which is input from the input shaft 13.

In the third embodiment, the planetary gear set 231 has plural planetary gears 244 whose respective first and second pinions 242, 243 are nonrotatably connected, wherein the diameter of the pitch circle of the first pinion 242 is different from that of the second pinion 243. Also, the speed change gear set 251 has plural planetary gears 254 whose respective third and fourth pinions 252, 253 are nonrotatably connected, wherein the diameter of the pitch circle of the third pinion 252 equals that of the first pinion 242, and that of the fourth pinion 253 equals that of the second pinion 243. Because so-called two pinion gears are used for the planetary gears 244 and 254, the planetary gear set 231 and the speed change gear set 251 provide high speed change ratios and sufficient engagements between respective gears. Therefore the motor 232 is able to supply sufficient torque to provide the differential rotation without more power or an additional gear set, so as to be downsized. Therefore the torque distributing apparatus 8 is downsized.

The first, second, third and fourth pinions 242, 243, 252 and 253 respectively engage with the first, second, third and fourth gears 246, 247, 256 and 257 which are all ring gears. Such engagements are provided by internal gears and external gears so as to minimize the contact stress between the gears. Thus, the required strength for the planetary gears 244 and 254 is reduced so that the planetary gears 244, 254 are able to be downsized, whereby the torque distributing apparatus 8 is also able to be downsized. Additionally, because all gears engaging with the planetary gears 244, 254 are ring gears, respective ring gears 246, 247, 256, 257 and planetary carriers 245, 255 are sufficiently supported by simple constructions. Therefore the torque distributing apparatus 8 is downsized and it is easy for the planetary gear set 231 and the speed change gear set 251 to be assembled.

The planetary carriers 245 and 255 are the cylinders with bottoms. Respective circumferential walls 276, 286 of the planetary carriers 245, 255 have plural numbers of openings 277, 287 corresponding to the number of the planetary gears 244, 254. Respective planetary gears 244, 254 are rotatably provided in respective planetary carriers 245, 255 where respective teeth of the first, second, third and fourth pinions 242, 243, 252 and 253 protrude through the respective openings 277, 287. Such planetary carriers 245, 255 provide simple constructions sufficiently supporting respective planetary gears 244, 254 so as to be downsized. Thus the torque distributing apparatus 8 is downsized. Additionally, respective planetary gears 244, 254 and planetary carriers 245, 255 are united so as to be easily assembled into the planetary gear set 231 and the speed change gear set 251.

Respective planetary carriers 245, 255 have the holes 270a, 270b, 280a and 280b around their rotational axes, and are supported by inserting the first output shaft 12L through the holes 270a, 270b, 280a, 280b. Such simple construction sufficiently supports the planetary carriers 245, 255 without collision with the ring gears 246, 247, 256, 257, so as to downsize the torque distributing apparatus 8.

Respective planetary carriers 245, 255 have the flanges 279, 289 on their circumferential walls 276, 286. The flanges 279, 289 are located between the first pinion 242/third pinion 252 and second pinion 243/fourth pinion 253. Respective flanges 279, 289 fix respective planetary carriers 245, 255 to the nonrotational parts (motor 232 and housing 11). Such flanges 279, 289 provide collision free support between the planetary carriers 245, 255 and the nonrotational parts. That makes the support constructions of the second ring gear 247 and fourth ring gear 257 simple so as to downsize the torque distributing apparatus 8.

The motor 232 is a brushless motor which has a hollow rotor 232a. The motor 232 is placed radially and coaxially outward of the planetary gear set 231. Such construction provides a large diameter of the motor 232, although the torque distributing apparatus 8 does not become larger. Thus the motor is able to supply large torque without a reduction gear, so as to be downsized. Therefore the torque distributing apparatus 8 is downsized. Because of no reduction gear, when the vehicle runs on the μ-split road and one wheel slips, over-speed of the motor 232 will not happen, so as gain reliability. In addition, because of the coaxial mount of the motor 232, the housing 11 has no overhang so as to easily prevent interference with an underbody of the vehicle or the other parts. Thus the torque distributing apparatus 8 is easily installed to the vehicle.

The third embodiment can be modified. Although, in the third embodiment, the motor 232 is a brushless motor which has the rotor 232a surrounding the planetary gear set 231 coaxially, the coaxial arrangement is not needed and the other type of motor, e.g. brush motor, can be used.

Figure 9:
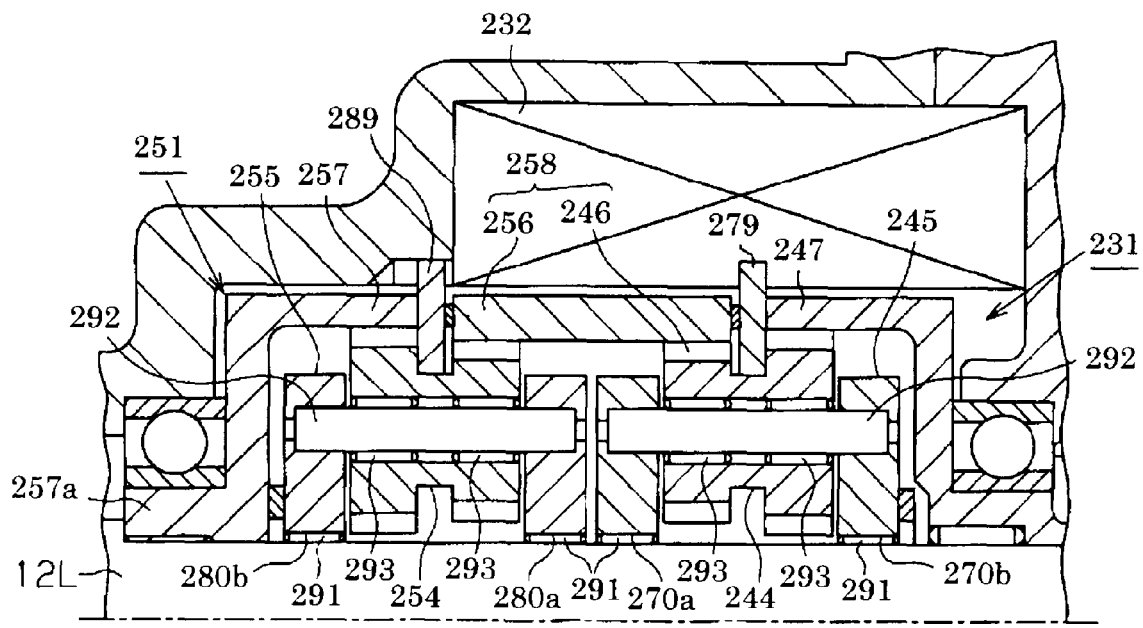
FIG. 9 is a modification of the third embodiment.

One modification of the third embodiment will be described with reference to FIG. 9. The third embodiment has the bushes intervening between respective holes 270a, 270b, 280a, 280b and the first output shaft 12L for the smooth rotation of the planetary carriers 245, 255 (see FIG. 5). In the modification, however, rolling bearings (e.g. needle bearings) 291 intervene between respective holes 270a, 270b, 280a, 280b of the planetary carriers 245, 255 and the first output shaft 12L as shown in FIG. 9. Such arrangement can rotate the planetary carriers 245, 255 more smoothly.

The planetary carrier 245 of the third embodiment has the both bottoms 278a, 278b with the bores 279a, 279b. Respective bores 279, 279b face each other and loosely fit respective spindles 244a of the planetary gears 244, so that the planetary gears 244 are rotatably supported by the planetary carrier 245 (see FIG. 5). In the modification, however, the planetary carriers 245, 255 have shafts 292 supporting the planetary gears 244, 254 via rolling bearings 293 as shown in FIG. 9. Such an arrangement can rotate the planetary gears 244, 254 more smoothly.

A fourth embodiment will be described with reference to FIGS. 10 and 11. In the fourth embodiment, the same/equivalent parts will be indicated by reference numbers having the same last two digits described hereinbefore and the explanation of those parts will be omitted.

Figure 10:
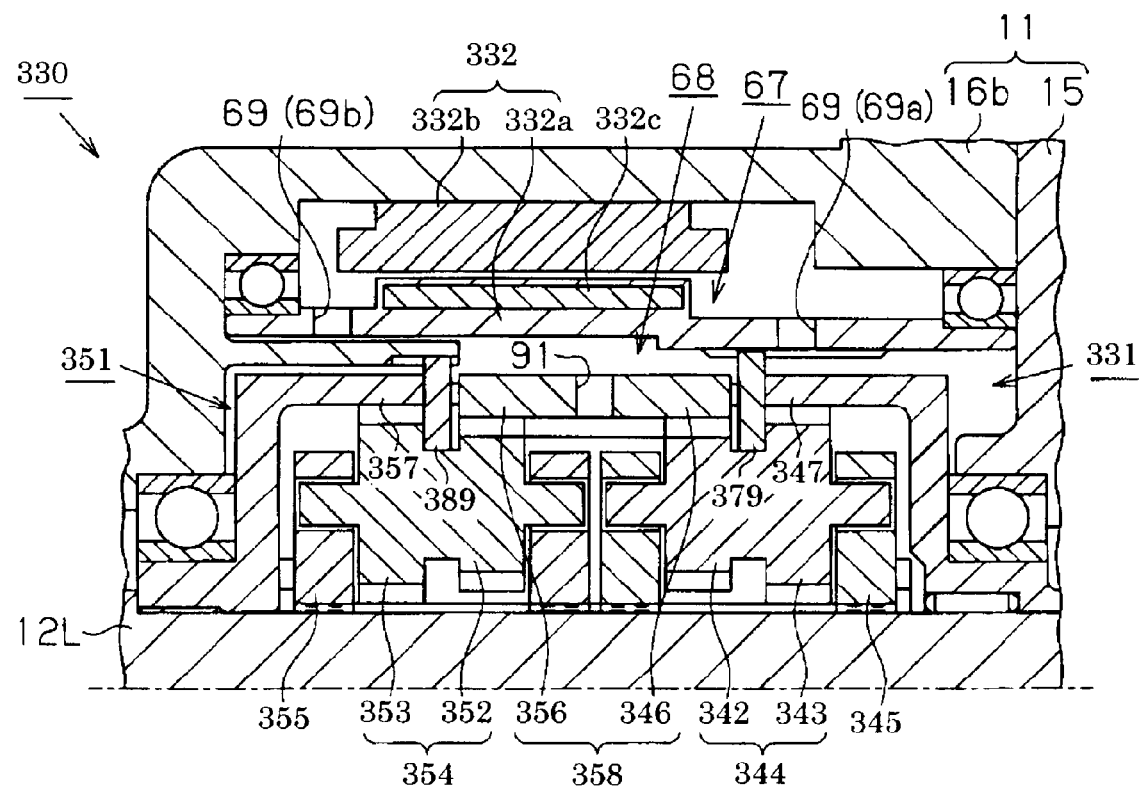
FIG. 10 is a section view of a torque distributor of a fourth embodiment related to the invention.

As shown in FIG. 10, in the torque distributor 330, the motor 332 has a hollow rotor 332a and a stator 332b. The rotor 332a is coaxially arranged radially outward of the planetary gear set 331 and the speed change gear set 351. The stator 332b is coaxially arranged radially outward of the rotor 332a. The motor 332 is a brushless motor whose rotor 332a has plural magnets 332c. The stator 332b is fixed onto the inner surface of the housing 11 (second housing 16b). The rotor 332a is rotatably supported by the ball bearings radially inward of the stator 332b in the housing 11.

The planetary carrier 345 of the planetary gear set 331 rotates about the first output shaft 12L as its rotational axis, and is spline-fitted into the rotor 332a. Namely the planetary gear set 331 is driven by the motor 332 through the engagement between the inner surface of the rotor 332a and the outer teeth of the flange 379 of the planetary carrier 345. Respective planetary gears 344 are rotatably supported by the planetary carrier 345 so as to revolve about the first output shaft 12L.

The speed change gear set 351 has the planetary gears 354 and the planetary carrier 355, similar to the planetary gear set 331. The planetary carrier 355 rotates about the first output shaft 12L as its rotational axis, and is spline-fitted into the housing 11 (second housing 16b) via the outer teeth of the flange 389.

The second ring gear 347 is connected with the planetary carrier 24 of the differential gear unit 14 (see FIG. 5) for no relative rotation, and engages with the second pinions 343 of the planetary gear set 331. The fourth ring gear 357 is connected with the first output shaft 12L for no relative rotation, and engages with the fourth pinions 353 of the speed change gear set 351. The cylindrical sleeve 358 has the first ring gear 346 which engages with the first pinions 342 of the planetary gear set 331, and the third ring gear 356 which engages with the third pinions 352 of the speed change gear set 351.

Figure 11:
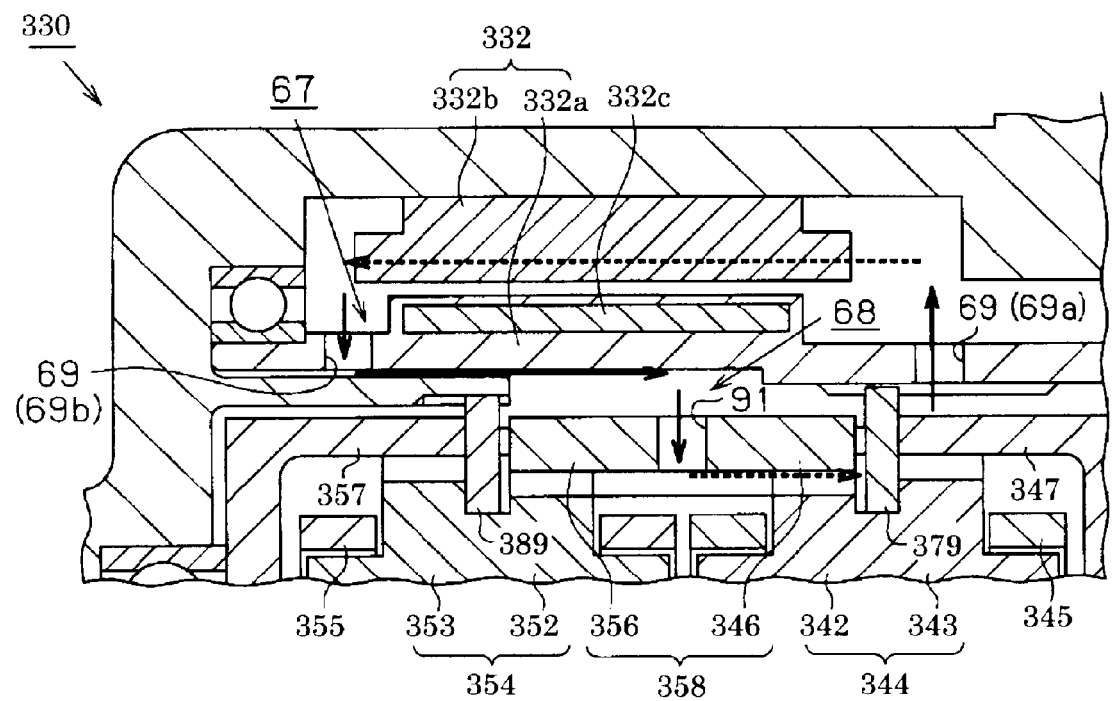
FIG. 11 is an enlarged section view of the torque distributor of the fourth embodiment.

As shown in FIGS. 10 and 11, the rotor 332a of the motor 332 has plural through holes 69 (69a and 69b), wherein the through holes 69a are located outward of the planetary gear set 331 and the through holes 69b are located outward of the speed change gear set 351. The sleeve 358 has plural through holes 91 between the first and third ring gears 346, 356. Thus the motor room 67 communicates with the gear room 68 so that the lubricant oil in the gear room 68 is stirred by the gears and flows into the motor room 67. Namely, as shown in FIG. 11, the lubricant oil is stirred by the gears so as to flow into the motor room 67 through the through holes 69a. The lubricant oil goes through the motor room 67 (including air gap, teeth wound by coil, etc.) between the rotor 332a and the stator 332b, and returns to the gear room 68 through the through holes 69b of the rotor 332a and the through holes 91 of the sleeve 358. Therefore the lubricant oil smoothly flows into the motor room 67 so as to efficiently circulate.

Respective embodiments can be modified as described hereinafter.

Although the first to fourth gears 46 (246, 346), 47 (247, 347), 56 (256, 356), 57 (257, 357) are all sun gears in the first and second embodiments and all ring gears in the third and fourth embodiments as the first to fourth gears, any combination of sun gears and ring gears may be applied.

In the fourth embodiment, the second ring gear 247 may have through holes for more smooth flow of the lubricant oil.

Just for circulating the lubricant oil, the through holes of second and fourth embodiments may be applied to the apparatus which does not have the speed change gear set.

Figure 12:
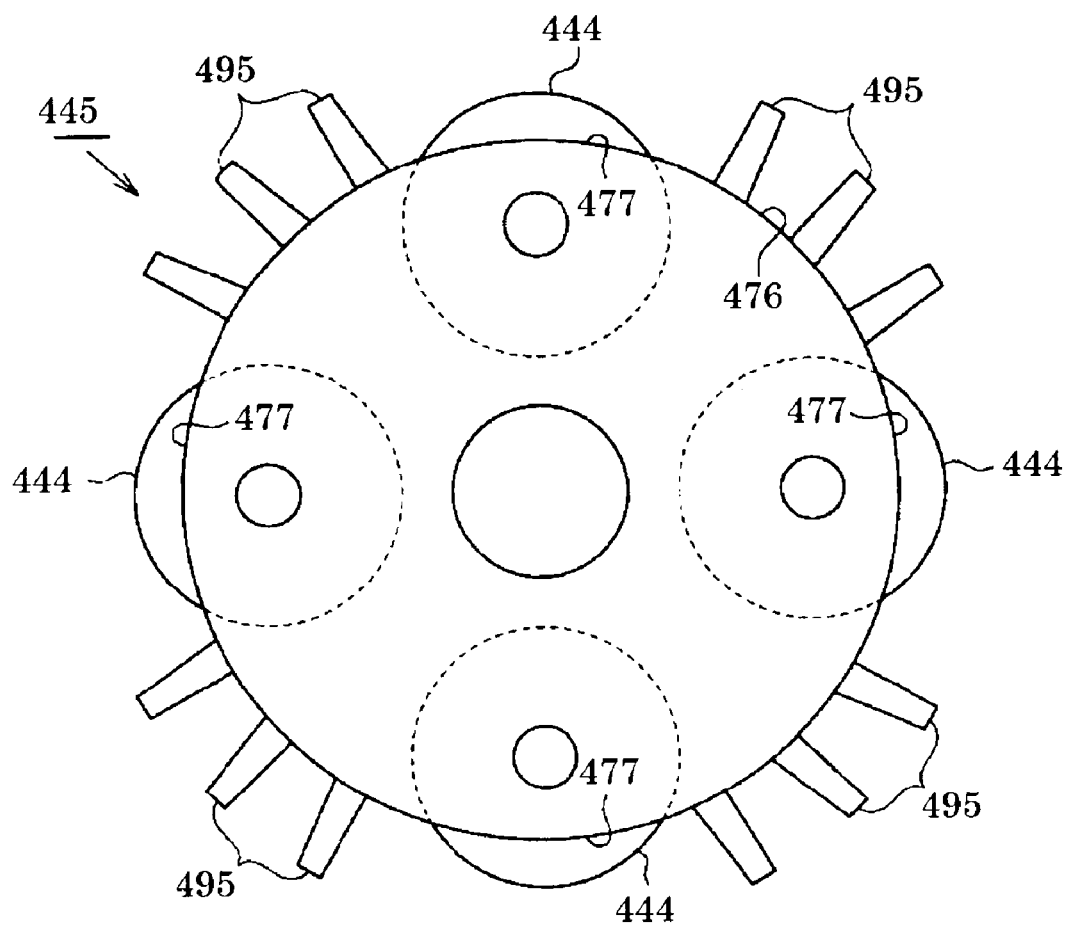
FIG. 12 is a modification of a planetary carrier of the embodiments related to the invention.

At least one of the parts of the planetary gear set may have fins to stir the lubricant oil. For example, as shown in FIG. 12, the planetary carrier 445 is cylinder-like and has openings 477 where the planetary gears 444 protrude through. The outer surface 476 of the planetary carrier 445 has plural fins 495 where the openings 477 are not present. Such fins 495 sufficiently stir the lubricant oil.

Obviously, numerous modifications and variations of the present invention are possible in light of the above teachings. It is thereby to be understood that within the scope of the appended claims, the present invention may be practiced otherwise than as specifically described herein.

What is claimed is:

1. A torque distributing apparatus comprising a differential gear unit transmitting an input torque to first and second output shafts while allowing a differential rotation between the first and second output shafts, a planetary gear set arranged between the first and second output shafts, a motor driving the planetary gear set, and a speed change gear set compensating a speed change ratio of the planetary gear set, wherein:

the planetary gear set is arranged coaxially outward of the first output shaft, and has a plurality of planetary gears, a planetary carrier carrying the planetary gears revolvably and rotatably, a first gear engaging with the planetary gears and a second gear engaging with the planetary gears, wherein the planetary carrier is an input element of a torque of the motor;

the speed change gear set is arranged coaxially outward of the first output shaft, and has a plurality of planetary gears, a planetary carrier carrying the planetary gears rotatably, a third gear engaging with the planetary gears and a fourth gear engaging with the planetary gears, wherein the planetary carrier is fixed to a nonrotatable portion;

the first gear of the planetary gear set is integrated with the third gear of the speed change gear set;

one of the second gear and the fourth gear is connected with the first output shaft for no relative rotation, and the other is connected with the differential gear unit; and the motor is arranged outward of the planetary gear set and the speed change gear set and is coaxial with the planetary gear set and the speed change gear set, wherein the speed change gear set is arranged axially between the planetary gear set and the differential gear unit, and wherein the fourth gear directly drives a member of the differential gear unit.

2. The torque distributing apparatus according to claim 1, wherein:

respective planetary gears of the planetary gear set have first and second pinions whose diameters of pitch circles are different each other, and the first pinions engage with the first gear and the second pinions engage with the second gear; and respective planetary gears of the speed change gear set have third and fourth pinions whose diameter ratio of pitch circles equals to that of the first and second pinions respectively, and the third pinions engage with the third gear and the fourth pinions engage with the fourth gear.

3. The torque distributing apparatus according to claim 1, wherein a rotor of the motor has at least one through hole to communicatively connect a room in the motor to a room for the planetary gear set and the speed change gear set.

4. The torque distributing apparatus according to claim 1, wherein the first to fourth gears are all sun gears.

5. The torque distributing apparatus according to claim 1, further comprising a housing, wherein the planetary gear set, the speed change gear set, the motor and a lubricating oil are provided in the housing, whereby the lubricating oil agitated by the planetary gear set and the speed change gear set will cool the motor.

* * * * *